US006704134B2

(12) United States Patent
Yokoyama

(10) Patent No.: US 6,704,134 B2
(45) Date of Patent: Mar. 9, 2004

(54) OPTICAL AMPLIFIER, OPTICAL AMPLIFYING REPEATER AND TRANSMISSION APPARATUS OF WAVELENGTH DIVISION MULTIPLEXED SIGNAL LIGHT USING THE SAME

(75) Inventor: Ryu Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/795,349

(22) Filed: Mar. 1, 2001

(65) Prior Publication Data

US 2001/0019448 A1 Sep. 6, 2001

(30) Foreign Application Priority Data

Mar. 2, 2000 (JP) ........................................ 2000-57290

(51) Int. Cl.[7] .................................................. H01S 3/00
(52) U.S. Cl. ...................................................... 359/334
(58) Field of Search ............................ 359/334, 341.1, 359/337.11

(56) References Cited

U.S. PATENT DOCUMENTS

| | | | | | |
|---|---|---|---|---|---|
| 5,280,549 | A | | 1/1994 | Barnard et al. | 385/15 |
| 5,323,404 | A | | 6/1994 | Grubb | 372/6 |
| 5,883,736 | A | | 3/1999 | Oshima et al. | 359/341 |
| 6,038,061 | A | * | 3/2000 | Sugaya | 359/160 |
| 6,191,877 | B1 | * | 2/2001 | Chraplyvy et al. | 359/124 |
| 6,292,291 | B1 | * | 9/2001 | Yoon et al. | 359/337.13 |
| 6,320,884 | B1 | * | 11/2001 | Kerfoot et al. | 372/3 |
| 6,344,922 | B1 | * | 2/2002 | Grubb et al. | 359/334 |
| 6,344,925 | B1 | * | 2/2002 | Grubb et al. | 359/341.3 |
| 6,359,725 | B1 | * | 3/2002 | Islam | 359/334 |
| 6,384,962 | B1 | * | 5/2002 | Foursa et al. | 359/334 |
| 6,417,961 | B1 | * | 7/2002 | Sun et al. | 359/334 |

FOREIGN PATENT DOCUMENTS

| | | | | |
|---|---|---|---|---|
| EP | 0 911 926 A1 | 4/1999 | | |
| JP | 10-22931 | 1/1998 | H04B/10/17 | |
| WO | WO 00/05622 | 2/2000 | | |

OTHER PUBLICATIONS

Masuda et al. 1.65 micrometer band fibre Raman amplifier pumped by wavelength–tunable amplified spontaneous emission lig source. Electronics Letters. Nov. 26th, 1998. vol. 24. pp. 2339–2340.*

Namiki et al. Ultrabroad–Band Raman Amplifiers Pumped and Gain–Equalized by Wavelength–Division–Multiplexed High–Power Laser Diodes. IEEE Journal on Selected Topics in Quantum Electronics, vol. 7, No. 1, Jan./Feb. 2001. pp. 3–16.*

* cited by examiner

*Primary Examiner*—Thomas G. Black
*Assistant Examiner*—Deandra M. Hughes
(74) *Attorney, Agent, or Firm*—McGinn & Gibb, PLLC

(57) ABSTRACT

Flatness of a gain (optical output level) is maintained even when a wavelength division multiplex signal light (WDM signal light) is amplified in an optical amplification utilizing Raman amplification function. The optical amplifier comprises: two (first and second) pumping light sources for Raman amplification for outputting first and second pumping lights; the wavelength multiplexer for Raman amplification for allowing the first and second pumping lights to be incident on optical fiber transmission paths, where the WDM signal light propagates, in the direction opposite to the propagation direction of the signal light. The signal lights are Raman amplified by the both pumping lights. A wavelength of the first pumping light is set such that the gain of the Raman amplified signal light declines in the right direction, and, on the other side, the wavelength of the second pumping light is set such that the gain declines in the left direction. Gradients for showing a relation between the wavelength and the gain in Raman amplification by the first and second pumping lights are made to be in opposite directions from each other. Optical output levels and the wavelengths of the first and second pumping lights are set such that the gains for the signal lights included in the Raman amplified WDM signal light become substantially equal to each other.

2 Claims, 14 Drawing Sheets

OPTICAL AMPLIFIER, OPTICAL AMPLIFYING REPEATER AND TRANSMISSION APPARATUS OF WAVELENGTH DIVISION MULTIPLEXED SIGNAL LIGHT USING THE SAME

BACKGROUND OF THE INVENTION

1. Field of the Invention

The present invention relates to an optical amplifier that amplifies a signal light based on Raman amplification function, an optical amplifying repeater and an optical transmission apparatus that are constituted by using the optical amplifier. More particularly, the present invention relates to an optical amplifier that collectively amplifies a signal light, in which signal lights having a plurality of wavelengths different from each other are wavelength division multiplexed (hereinafter referred to as a WDM signal light), and an optical amplifier that comprises a flattening function of a gain for each signal light.

2. Description of Related Art

It is known that Raman amplification function is generated by allowing a pumping light having a specified wavelength to be incident on a signal light that propagates in an optical fiber transmission path, and thereby an optical amplification of the signal light can be performed (for example, refer to Japanese Patent Laid-open No.10 (1998)-022931 gazette). The optical amplification by Raman amplification is performed by allowing the pumping light having the specified wavelength to be incident on the optical fiber transmission path in an opposite direction to a progress direction of the signal light that propagates in the optical fiber transmission path.

Incidentally, the optical amplification utilizing Raman amplification function could be utilized independently. However, in most cases, it is normally used in combination with the optical amplification which has a rare-earth element doped optical fiber as an amplification medium (hereinafter referred to as a normal optical amplification). In an optical amplifying repeater arranged midway or at an output end of the optical fiber transmission path, and in a front optical amplifier arranged within an optical reception terminal station, the pumping light for performing Raman amplification is incorporated in addition to the normal optical amplification in order to improve the gain.

However, when the optical amplification is performed on the WDM signal light by Raman amplification function, a difference (deviation) occurs in optical output levels of each signal light included in the WDM signal light after the optical amplification, since Raman amplification itself has a wavelength dependency of the gain. With regard to the difference of the optical output level, amounts of the difference are added in the multi-step optical amplification and repeating transmission system, resulting in large influences to a transmission characteristic.

Generally, an output wavelength characteristic of the optical amplifier as described above is designed in a state such that the WDM signal light to be input does not have the deviation in the optical output level depending on a wavelength. However, the WDM signal light, on which the optical amplification was performed by Raman amplification function generated in the optical fiber transmission path connected to an input portion of the optical amplifier, further undergoes the normal optical amplification. Therefore, at the time when the WDM signal light is input to the optical amplifier, when the deviation exists in optical input levels among the signal lights included in the WDM signal light, the deviation is further increased by the normal optical amplification. As a result, a desired output wavelength characteristic cannot be obtained.

The gain by Raman amplification is different from each other depending on the wavelength of the signal light and having the wavelength dependency, and the wavelength dependency itself is dependent on the wavelength of a pumping light source. Accordingly, there is a problem of difficulties in controlling the wavelength characteristic of the signal light uniformly, due to scattering of the wavelength at the time of manufacturing the pumping light source, a wavelength fluctuation according to difference in a pumping light intensity and a temperature at which the pumping light source is used, and the like.

SUMMARY OF THE INVENTION

The object of the present invention is to maintain uniformity in the gain even when the optical amplification is performed on the WDM signal light by the optical amplification utilizing Raman amplification function. Moreover, another object of the present invention is to make the optical output level of each signal light included in the WDM signal light to be uniform.

The object of the optical transmission apparatus of the present invention is, to perform a stable optical transmission such that a large deviation does not occur in the optical output level of each signal light, even in the case where the WDM signal light is transmitted.

To solve the foregoing problems, the optical amplifier of the present invention comprises: a first pumping light source for Raman amplification, which outputs a first pumping light having a first wavelength; a second pumping light source for Raman amplification, which outputs a second pumping light having a second wavelength; and a wavelength multiplexer for Raman amplification, which allows the first and second pumping lights to be incident on the optical fiber transmission path where the signal light propagates. The signal light is Raman amplified in the optical fiber transmission path by the first and second pumping lights. A propagation direction of the first and second pumping lights may be backward or may be forward (the same direction) to that of the signal lights.

Although the signal light may be applied to a single signal light, it is, specifically, the WDM signal light, in which the signal lights having a plurality of wavelengths different from each other are wave length division multiplexed. In other words, the optical amplifier of the present invention, with regard to the pumping light for performing Raman amplification, allows two pumping lights having the wavelengths different from each other to be incident on the optical transmission path.

In the above-described constitution, to reduce the influence on the WDM signal light from the wavelength dependency of the gain, which occurs when the optical amplification by Raman amplification is performed, the first wavelength is the wavelength to allow the signal light to be Raman amplified such that the wavelength having the peak gain by Raman amplification becomes shorter than the wavelength of the signal light included in the WDM signal light. On the other hand, the second wavelength is the wavelength to allow the signal light to be Raman amplified such that the wavelength having the peak gain by Raman amplification becomes longer than the wavelength of the signal light included in the WDM signal light.

Herein, a gradient showing the relation between the wavelength and the gain in Raman amplification by the first pumping light and a gradient showing the relation between the wavelength and the gain in Raman amplification by the second pumping light are in opposite directions from each other. The optical output level and the wavelength of the first and second pumping lights are respectively set such that the gains for signal lights included in the WDM signal light, on which Raman amplification was performed by the first and second pumping lights, become substantially equal to each other.

In the above-described constitution, the first and second pumping light sources for Raman amplification can be constituted of: first and second laser diodes that oscillate first and second lights respectively; and first and second fiber gratings, which are arranged in a previous step of the first and second laser diodes, that selectively transmit the lights having the first and second wavelengths in a specified ratio and reflect residual light. Alternatively, the first and second pumping light sources for Raman amplification can be also constituted of: the first and second laser diodes that oscillate the first and second lights respectively; and first and second optical filters, which are arranged in a previous step of the first and second laser diodes, that selectively transmit the lights having the first and second wavelengths.

The wavelength multiplexer in the optical amplifier for Raman amplification of the present invention, more particularly, can be constituted of: first and second pumping light multiplexers for Raman amplification, which are arranged by connecting to an optical fiber connected to the optical fiber transmission path, that transmit the signal light and allow the first and second pumping lights to be incident on the optical fiber. Alternatively, the wavelength multiplexer can be constituted of: a pumping light multiplexer for Raman amplification, which multiplexes the first and second pumping lights and outputs a multiplexed pumping light; and a pumping light multiplexer for Raman amplification, which is arranged by connecting to the optical fiber connected to the optical fiber transmission path, that transmits the signal light and allows the multiplexed pumping light to be incident on the optical fiber. Moreover, the wavelength multiplexer can be also constituted of: a polarization combiner for Raman amplification; and a pumping light multiplexer for Raman amplification. The former performs the polarization combination of the first and second pumping lights and outputs the multiplexed pumping light, where the first and second pumping lights, which are respectively output from the first and second pumping light sources for Raman amplification, are perpendicular to each other, that is, in a polarization state. The latter, which is arranged by connecting to the optical fiber connected to the optical fiber transmission path, transmits the signal light and allows the multiplexed pumping light to be incident on the optical fiber.

For the purpose of improving uniformity of the gain of the signal light included in the WDM signal light or the optical output level itself, a constitution can be adopted where a feedback control is performed to the optical amplification by Raman amplification function, which is obtained by the above-described constitution. Specifically, in addition to the above-described constitution, the wavelength multiplexer is further allowed to comprise: an optical splitter for splitting a part of the WDM signal light and outputs the split WDM signal light; signal light extractor to extract two signal lights, which have the wavelengths different from each other, from each signal light included in the split WDM signal light; an optical receiver to detect the optical output level of each of the two signal lights extracted by the signal light extractor; and a pumping light output control circuit for controlling the optical output levels or the wavelengths of the first and second pumping lights for Raman amplification according to the amount of difference between the two optical output levels.

Although the above-described optical amplifier of the present invention has an independent optical amplification function only by Raman amplification function, it can be also used in combination with the normal optical amplification function, in which the optical amplification is performed by using the rare-earth element doped optical fiber (for example, an erbium doped fiber) as the amplification medium. Specifically, in the above-described optical amplifier, the optical amplification by Raman amplification and the normal optical amplification are used in combination by further comprising: an amplification medium for amplifying the signal light; a third pumping light source for outputting a third pumping light to allow the amplification medium to be in an excited state; and a wavelength multiplexer for allowing the third pumping light to be incident on the amplification medium.

The wavelength multiplexer in such a constitution may be arranged at a position from which the signal light is input to the amplification medium, and the third pumping light may be allowed to be incident on the amplification medium in the same direction as the propagation direction of the signal light. Alternatively, the wavelength multiplexer may be arranged at an output side of the amplification medium from which the signal light is output, and the third pumping light is allowed to be incident on the amplification medium in the opposite direction to the propagation direction of the signal light. On the side to which the signal light of the wavelength multiplexer for Raman amplification is output, an optical isolator may be arranged, which selectively transmits only the light propagating to the same direction as that of the signal light and obstructs the light propagating in the opposite direction. According to such constitution, a reflected returning light or the influence by the pumping light for Raman amplification, which comes from the optical amplifier arranged in a subsequent step, is reduced, thus more stable optical amplification can be performed.

The constitution of the feedback control for the purpose of obtaining uniformity of the gain of the signal light included in the WDM signal light or of the optical output level itself can be also applied to the constitution where the normal optical amplification is used in combination. Specifically, in addition to the above-described constitution, the optical amplifier is further allowed to comprise: the optical splitter for splitting a part of the WDM signal light and outputs the split WDM signal light; the signal light extractor to extract two signal lights, which have the wavelengths different from each other, from each signal light included in the split WDM signal light; the optical receiver for detecting the optical output level of each of the two signal lights extracted by the signal light extractor; and the pumping light output control circuit for controlling the optical output levels or the wavelengths of the first and second pumping lights for Raman amplification according to the amount of difference between the two optical output levels.

The optical splitter may be arranged at a position from which the WDM signal light is input to the wavelength multiplexer for Raman amplification. Alternatively, the optical splitter may be arranged at a position to which the WDM signal light is output from the wavelength multiplexer for Raman amplification. In the case of the former constitution, the feedback control is performed intended for the flatness of the WDM signal light immediate before it is input to the optical amplifier. On the other hand, in the case of the latter constitution, the feedback control is performed intended for the uniformity of the WDM signal light after the optical amplification.

The optical amplifying repeaters of the present invention are arranged midway of upper and lower lines, and perform optical repeating and amplification for the signal lights propagating in each direction. As a basic constitution, the above-described optical amplifying repeaters are constituted to be arranged in each of the upper and lower lines. Specifically, the optical amplifying repeater is the one that comprises: the optical amplifier for a down signal, which is arranged in the optical transmission path for the down signal; and the optical amplifier for an up signal, which is arranged in the optical transmission path for the up signal. The optical amplifiers for down and up signals comprise the optical amplifiers of the present invention as described above.

In the above-described constitution, two of the pumping light sources for Raman amplification may be provided for each of the upper and lower lines. For more efficient constitution, the first pumping light source for Raman amplification, which is provided in the optical amplifier for the down signal and the first pumping light source for Raman amplification, which is provided in the optical amplifier for the up signal use a common first pumping light source for Raman amplification. And, the second pumping light source for Raman amplification, which is provided in the optical amplifier for the down signal and the second pumping light source for Raman amplification, which is provided in the optical amplifier for the up signal use a common second pumping light source for Raman amplification. The first and second pumping lights for Raman amplification output from the common first and second pumping light sources for Raman amplification may be coupled and split by an optical coupler, and then the split lights may be respectively output to the wavelength multiplexer for Raman amplification, which is provided in the optical amplifier for the down signal and to the wavelength multiplexer for Raman amplification, which is provided in the optical amplifier for the up signal. Such a constitution can be adopted in the case of the optical amplification performed independently by Raman amplification as well as in the case where the normal optical amplification is used in combination.

In the constitution where the normal optical amplification is used in combination, the optical amplifiers for the down and up signals further respectively comprise fourth pumping light sources for outputting a fourth pumping light to allow the amplification medium to be in the excited state. The third pumping light source provided in the optical amplifier for the down signal and the third pumping light source provided in the optical amplifier for the up signal are made to be a common third pumping light source. The fourth pumping light source provided in the optical amplifier for the down signal and the fourth pumping light source provided in the optical amplifier for the up signal are made to be a common fourth pumping light source. The third pumping light output from the common third pumping light source and the fourth pumping light output from the common fourth pumping light source are coupled and split by an optical splitting coupler, and the split lights may be respectively output to the wavelength multiplexers provided in the optical amplifiers for the down and up signals.

The WDM signal light transmission apparatus of the present invention comprises: an optical transmission terminal station for wavelength division multiplexing a plurality of signal lights having the wavelengths different from each other and for sending out the WDM signal light; the optical fiber transmission path for propagating the WDM signal light; an optical receiving terminal station for receiving the WDM signal light; and the optical amplifier of the present invention, which is arranged midway of the optical transmission path to repeat and amplify the WDM signal light.

Similarly, the WDM signal light transmission apparatus, which has the upper and lower lines, for transmitting the WDM signal light in both directions comprises: the optical transmission terminal station for wavelength division multiplexing a plurality of down signal lights having the wavelengths different from each other and for sending out a down WDM signal light; the optical fiber transmission path for the down signal light for propagating the down WDM signal light; the optical receiving terminal station for the down signal light for receiving the down WDM signal light; the optical transmission terminal station for wavelength division multiplexing a plurality of up signal lights having the wavelengths different from each other and for sending out an up WDM signal light,; the optical fiber transmission path for the up signal light for propagating the up WDM signal light; the optical receiving terminal station for the up signal light for receiving the up WDM signal light; and the optical amplifiers of the present invention, which are arranged midway of the up and down optical transmission paths to repeat and amplify the up and down WDM signal lights.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Next, embodiments of the optical amplifier of the present invention will be described in detail with reference to the drawings.

Figure 1:
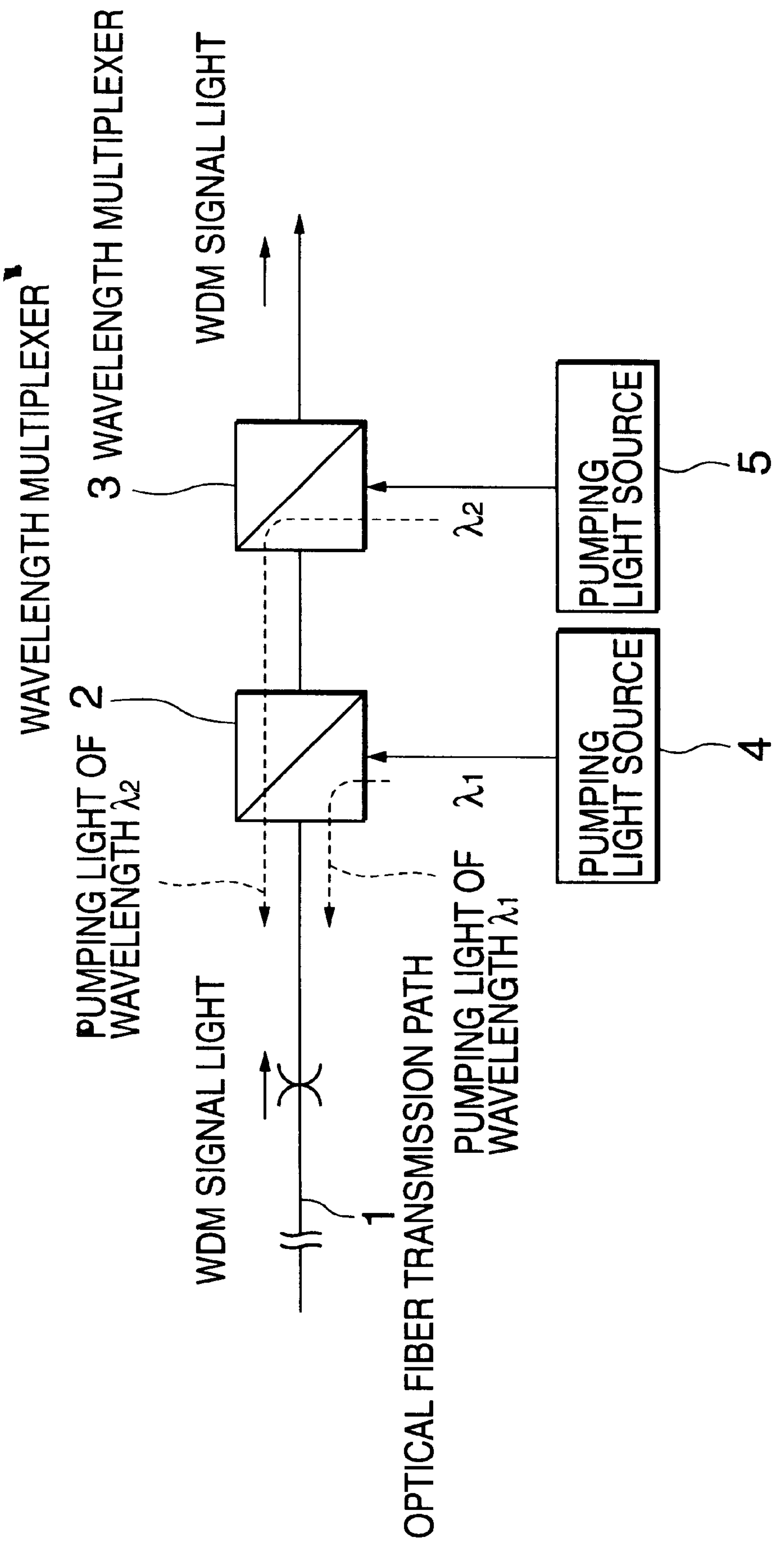
FIG. 1 is a view showing a constitution of a first embodiment of the optical amplifier of the present invention.

FIG. 1 is a view showing the constitution of the first embodiment of the optical amplifier of the present invention, which shows the fundamental principle of the optical amplifier of the present invention. The optical amplifier of the present invention comprises two pumping light sources 4 and 5 for outputting pumping lights, which have wavelengths to perform Raman amplification on the signal light propagating in an optical fiber transmission path 1.

The pumping lights output from each of the pumping light sources 4 and 5 are allowed to be incident on the optical fiber transmission path by wavelength multiplexers 2 and 3 arranged at an output end or the midway of the optical fiber transmission path 1 in the direction (the direction shown by arrows in broken lines) opposite to a propagation direction (the direction shown by arrows in solid lines) of the signal light (the WDM signal light). In the optical amplifier of the present invention, the signal light is Raman amplified by the pumping lights respectively output from the above-described pumping light sources.

Herein, description will be made for reduction of influence by the wavelength dependency of the gain in Raman amplification by the optical amplifier of the present invention, that is, principle and function of flattening of the optical output level. The present invention is based on assumption of the following findings. The gain in Raman amplification has the wavelength dependency, and is characterized in that a peak gain occurs at the wavelength which is longer than that of the pumping light by a specified amount of wavelength (approximately 100 to 120 nm) and gradually reducing at the wavelengths which are longer or shorter than that of the peak gain. This characteristic was confirmed in experiment or the like, and FIG. 2 schematically shows the relation between the wavelength and the gain by Raman amplification.

Figure 2:
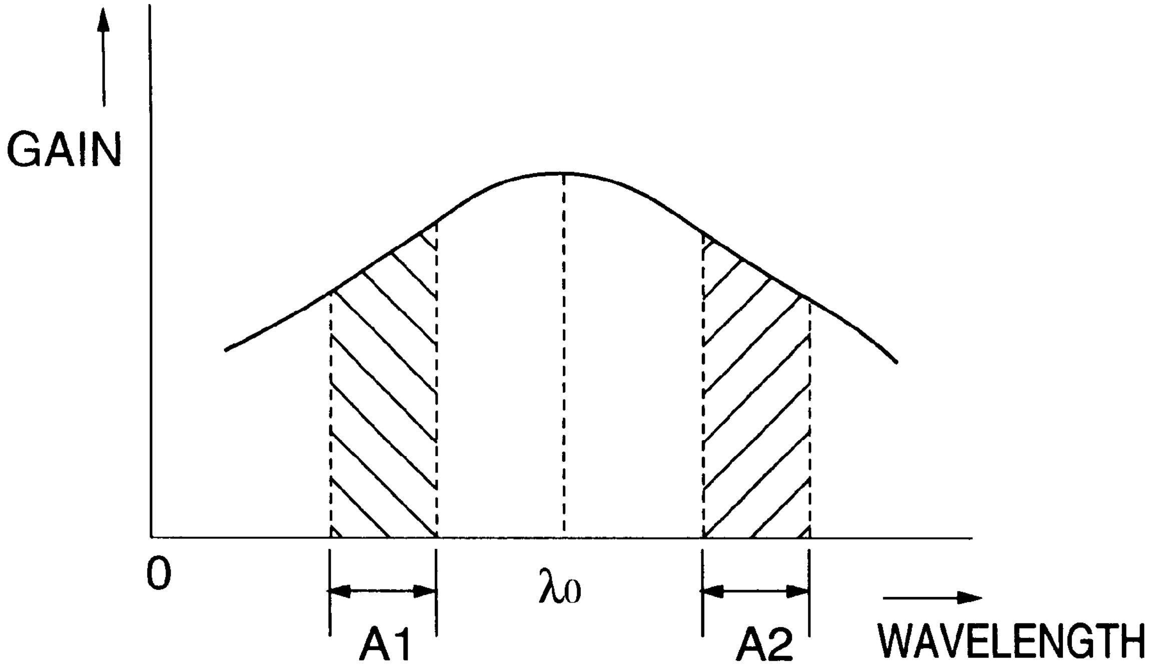
FIG. 2 is a graph for explaining a fundamental principle of the optical amplifier of the present invention, which shows a relation between a wavelength and a gain in Raman amplification.

Assuming that the peak gain occurs at the wavelengths longer than that of the pumping light by approximately 80 to 110 nm, when the signal light is Raman amplified by the pumping light having the wavelength $\lambda 0$ −90 nm, the gain is characterized in that its peak occurs at the wavelength $\lambda 0$ as indicated in FIG. 2 and gradually reduces as the wavelength goes off $\lambda 0$. Accordingly, the highest gain can be obtained by allowing the signal light to be Raman amplified by the pumping light having the wavelength shorter than the wavelength (herein after referred to as 'a center wavelength'), which is substantially the center of a wavelength range of the signal light included in the WDM signal light, by approximately 90 nm.

However, when such Raman amplification is performed, in the case where the number of the signal lights included in the WDM signal light is large (for example, 32 waves) and the above-described wavelength region is wide, a large deviation occurs between the gains of the signal light in the vicinity of the central portion where the peak gain is obtained and the gains of the signal light in an edge portion of the wavelength range.

Therefore, in the optical amplifier of the present invention, Raman amplification is made to occur by two pumping lights, which are first and second pumping lights. The first pumping light has a first wavelength set such that the wavelength, at which the peak gain by Raman amplification occurs, becomes shorter than the center wavelength of the WDM signal light, and the second pumping light, on the contrary, has a second wavelength set such that the wavelength becomes longer than the center wavelength.

Description is now made with reference to FIG. 2. By the first pumping light, the WDM signal light is Raman amplified with the gain characteristic shown by the wavelength range A2. On the other hand, by the second pumping light, the WDM signal light is Raman amplified with the gain characteristic shown by the wavelength range A1. In other words, the signal light is Raman amplified by each of the first and second pumping lights such that the gains have the gradients in specific directions (declining in the right and left directions). As a result of Raman amplification by the both pumping lights, the gain is made to be flat.

Figure 3A:
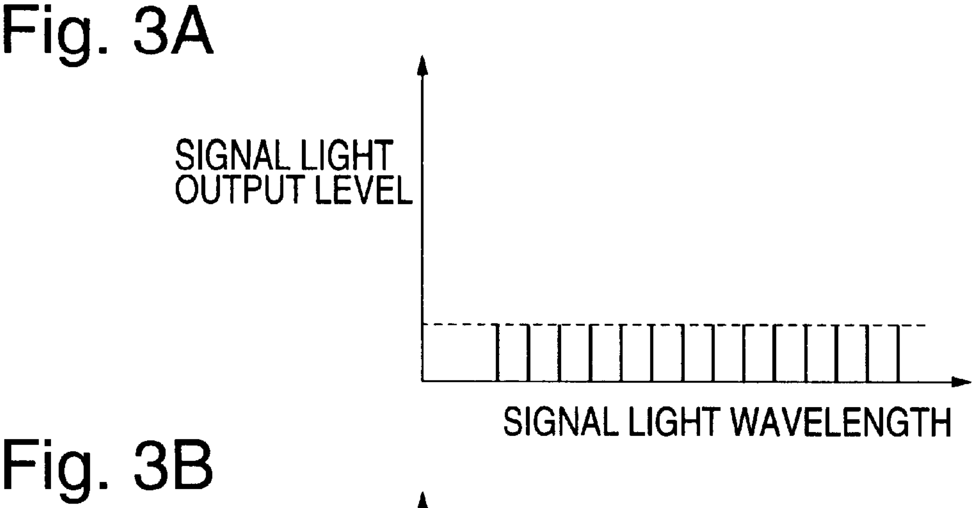
FIGS. 3A, 3B, 3C and 3D are graphs for explaining the fundamental principle of the optical amplifier of the present invention, which show relations between a wavelength and an output level of the WDM signal light in Raman amplification, in which 3A is a graph showing a relation between the wavelength and output level of the WDM signal light before Raman amplification, 3B and 3C showing relations between the wavelength and output level of the WDM signal light when an independent Raman amplification is performed, and 3D showing a final relation between the wavelength and output level of the WDM signal light.
Figure 3B:
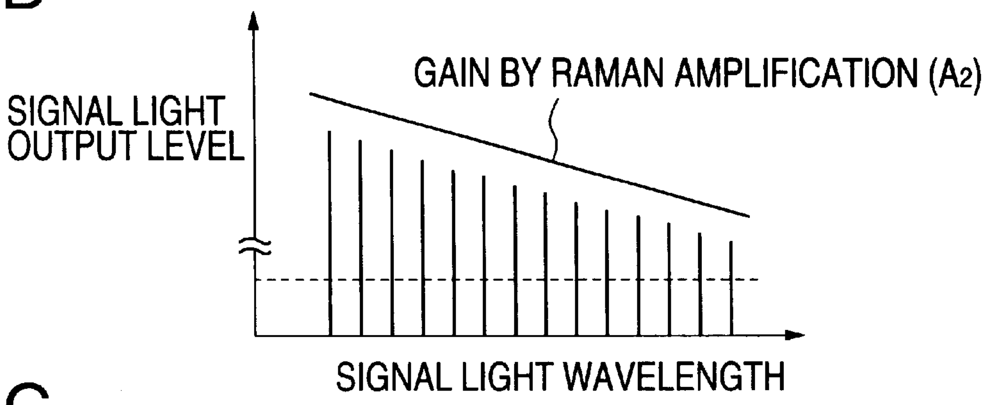
Figure 3C:
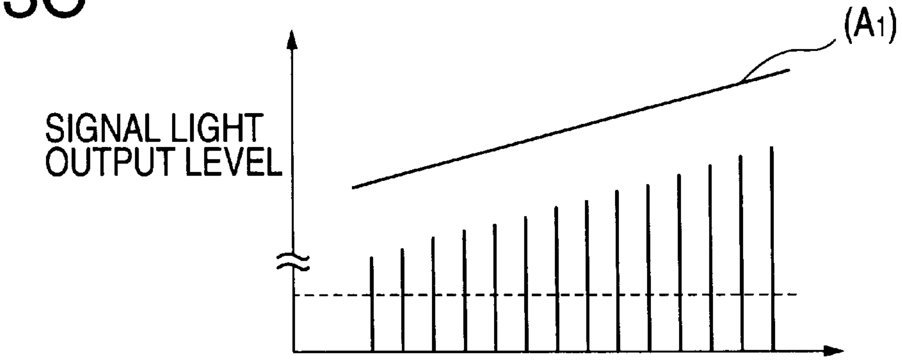
Figure 3D:
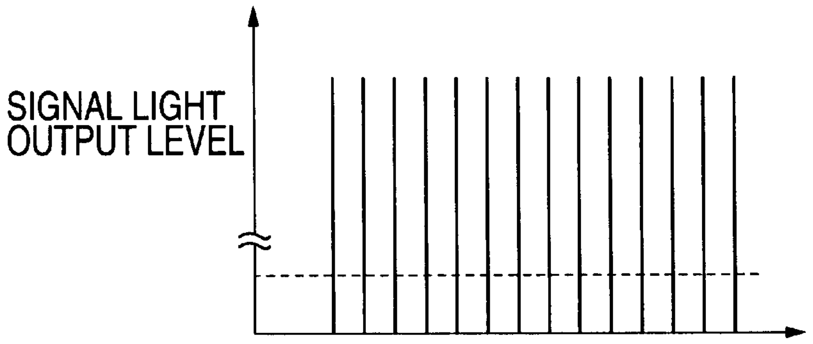

FIGS. 3A, 3B, 3C and D are graphs showing relations between the wavelength and the output level of the Raman amplified WDM signal light by the optical amplifier of the present invention. FIG. 3A shows the relation between the wavelength and the output level before Raman amplification is performed, and the optical output level of each signal light included in the WDM signal light is allowed to be uniform when the optical amplifier does not have a function to perform Raman amplification. FIGS. 3B and 3C show the output level of each signal light for the wavelength of the signal light when undergone the independent Raman amplification. It is understood that FIG. 3B shows the characteristic that declines in the right direction because the wavelength of the pumping light is set shorter than the center wavelength and FIG. 3C shows the opposite characteristic. FIG. 3D shows that characteristics of FIGS. 3B and 3C are superposed into the final relation between the wavelength of the signal light and the optical output level, and that the deviation in the optical output level are cancelled to be uniform.

Next, description will be made for a variation example of the optical amplifier of the present invention.

Figure 4:
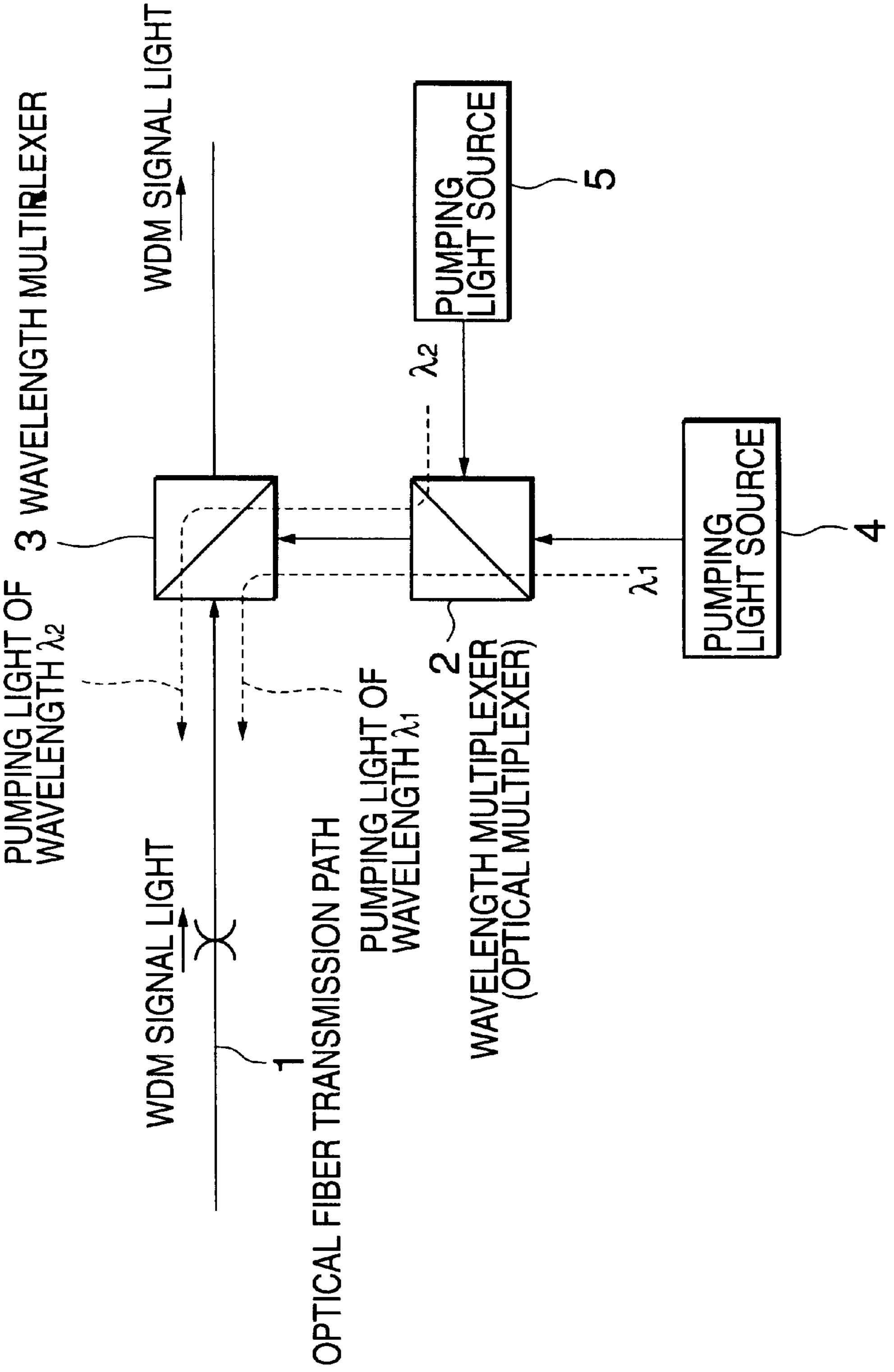
FIG. 4 is a view showing the first embodiment of the present invention, which shows a variation example of the constitution shown in FIG. 1.

FIG. 4 is a view showing the constitution of the first embodiment of the optical amplifier of the present invention, which shows the variation example of the constitution shown in FIG. 1.

The optical amplifier of the present invention is the one that allows the two pumping lights to be incident on the optical fiber transmission path for performing Raman amplification. The constitution for allowing the two pumping lights to be incident on the transmission path is not limited to the first embodiment shown in FIG. 1. Instead of arranging the wavelength multiplexers 2 and 3 midway of the optical fiber transmission path 1, as shown in FIG. 4, the pumping lights are previously multiplexed by the wavelength multiplexer (optical multiplexer) 2, and the multiplexed two pumping lights then may be allowed to be incident on the optical fiber transmission path 1 by the wavelength multiplexer 3 arranged midway of the optical fiber transmission path 1. This constitution is characterized in that a signal light loss is reduced owing to less number of the wavelength multiplexers arranged in the optical fiber transmission path 1.

Instead of the optical multiplexer 2, polarized waves output from the pumping light sources 4 and 5 are made to be in a perpendicular state with each other, and the both pumping lights may be multiplexed by a polarization multiplexer. Particularly, this constitution is suitable for the case where the wavelengths of the both pumping lights are adjacent to each other and multiplexing by the optical multiplexer is difficult. In the above-described embodiment, the pumping lights are allowed to be incident on the optical fiber transmission path in the direction opposite to that of the signal light as shown in FIG. 1. However, the similar effect can be obtained if the pumping lights are allowed to be incident on the transmission path in the forward direction, that is, toward the subsequent step.

Next, when Raman amplification is performed by the two pumping lights as described above, the pumping lights are required to be output in a single mode at specified wavelengths. Description will be made for the constitution for realizing such pumping light.

Figure 5:
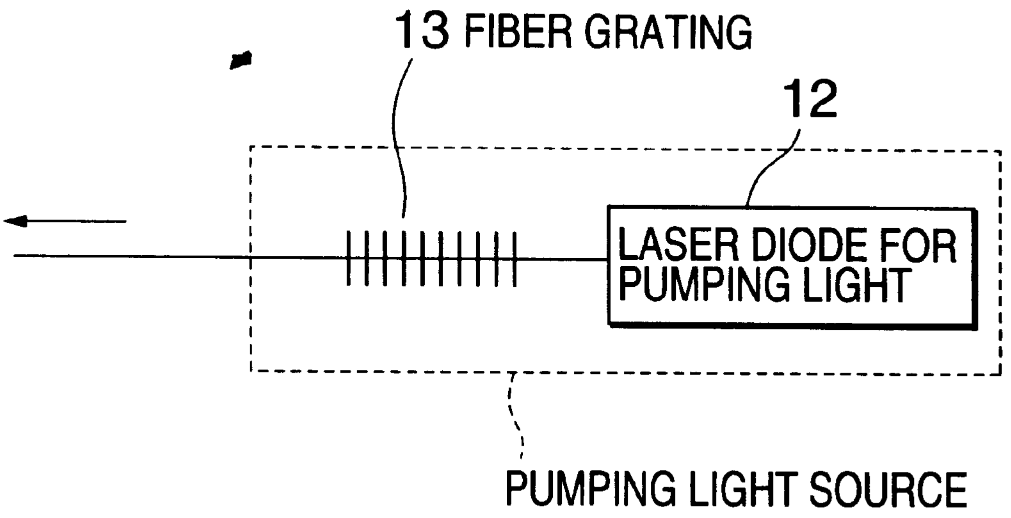
FIG. 5 is a view exemplifying a constitution of the pumping light for Raman amplification that is performed in the optical amplifier of the present invention.
Figure 6:
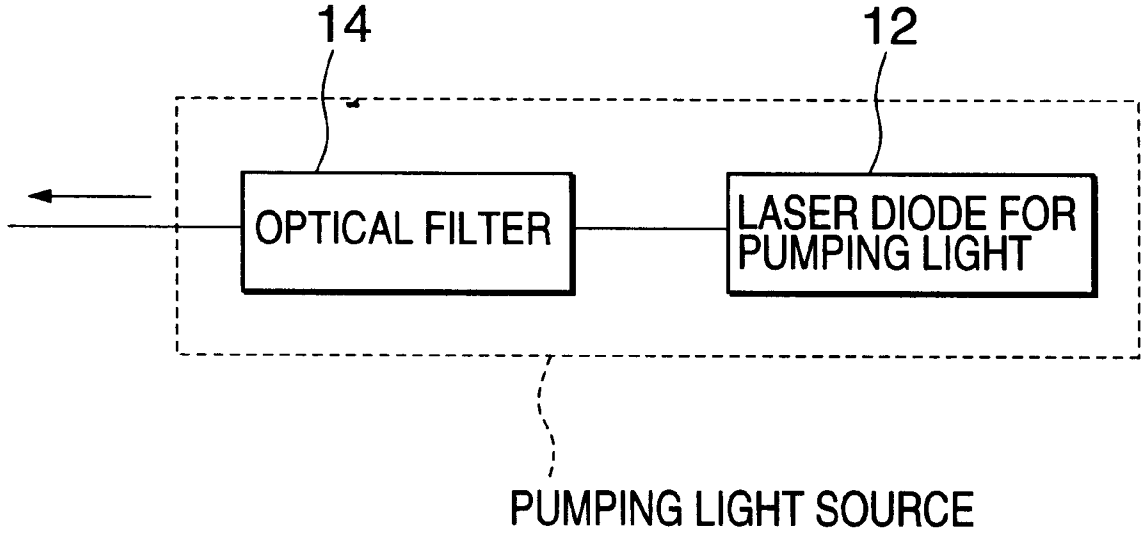
FIG. 6 is a view exemplifying another constitution of the pumping light for Raman amplification that is performed in the optical amplifier of the present invention.

FIG. 5 and FIG. 6 are views showing examples of the constitution of the pumping light source for Raman amplification. The constitution shown in FIG. 5 shows the one consisted of a laser diode 12 for oscillating the pumping light and a wavelength selective optical reflector (for example, a fiber grating) 13 arranged in front of the laser diode 12. Herein, the fiber grating 13 has a characteristic that it selectively reflects the pumping light of the above-described specified wavelength by a specified ratio from a few % to about 10%. With such a constitution, only the specified wavelength becomes an oscillated state, thus the pumping light having a stable wavelength is obtained.

FIG. 6 is an example where a bandpass optical filter 14, which selectively transmits only the light having the specified wavelength, is arranged instead of the fiber grating 13. According to this constitution, only light having only the specified wavelength is output from the pumping light source as the pumping light. In either constitution, the wavelength of the pumping light output from the pumping light source can be variably controlled. For example, in the constitution where the fiber grating 13 shown in FIG. 5 is used, the wavelength of the pumping light can be controlled by changing a period of the fiber grating 13. In the constitution where the optical filter 14 shown in FIG. 6 is used, the wavelength of the pumping light can be controlled by changing an angle of incidence to a dielectric multilayer.

Next, in the optical amplifier of the present invention, description will be made for the constitution where the optical amplification by Raman amplification and the normal optical amplification are used in combination. Although the above-described optical amplifier of the present invention shows the optical amplification independently by Raman amplification function, the normal optical amplification can be used in combination.

Figure 7:
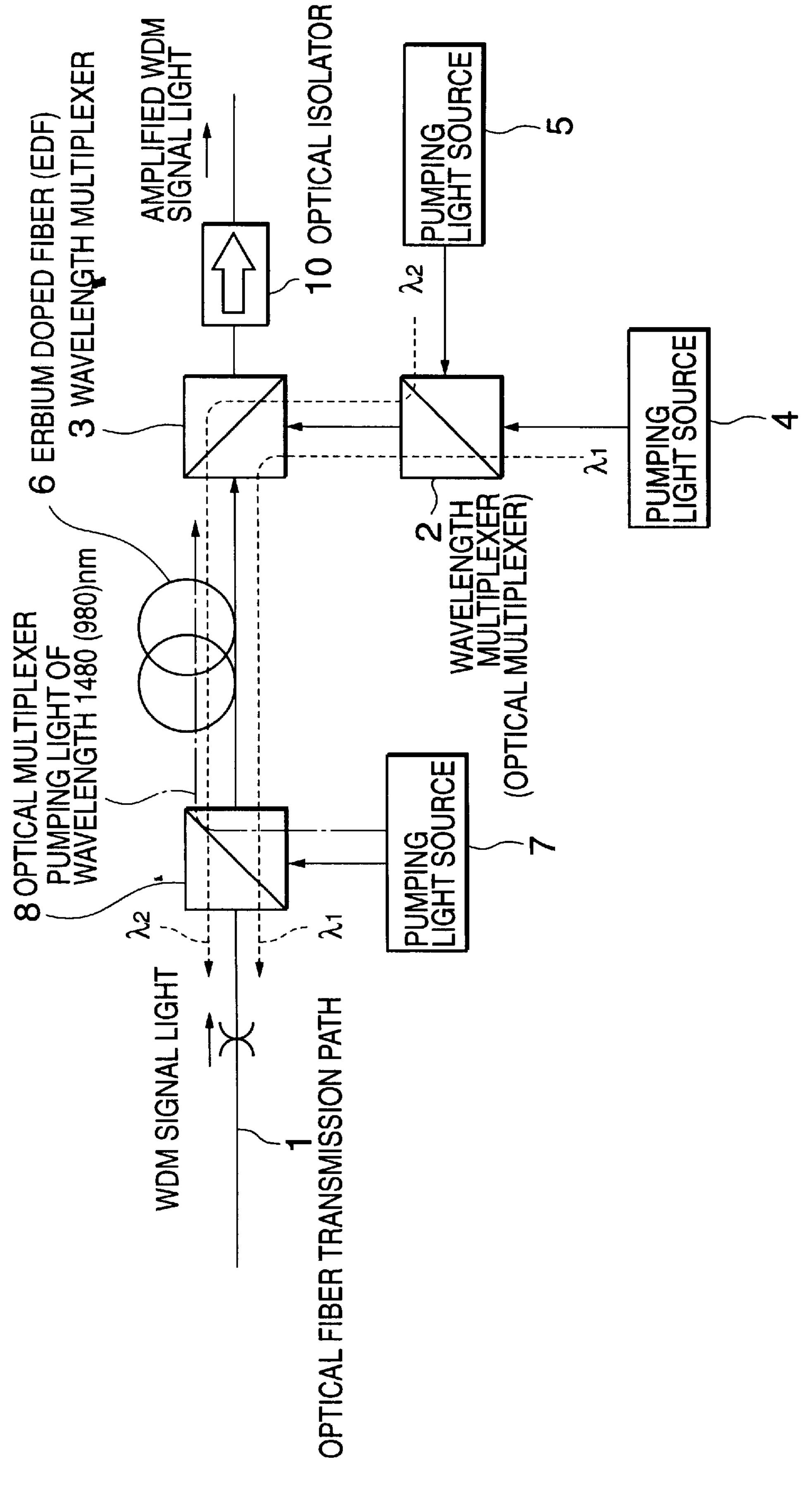
FIG. 7 is a view showing the constitution of a second embodiment of the optical amplifier of the present invention.

FIG. 7 is a view showing the constitution of the second embodiment of the optical amplifier of the present invention. The fundamental constitution is the same as the one shown in FIG. 4. The optical amplifier comprises: a rare-earth element doped fiber (herein, the wavelength of the signal light is set at 1550 nm and the erbium doped fiber (EDF) is used) 6 in the previous step of the wavelength multiplexer 3; a pumping light source 7 for outputting the pumping light to allow the amplification medium to be in the excited state; and an optical multiplexer 8, which is arranged in the previous step of the EDF 6, for allowing the pumping light to be incident on the EDF 6 in the same direction as that of the signal light. Herein, an optical isolator 10 is arranged to prevent lights from being incident on the EDF 6. The lights to be prevented from incidence are: the reflected returning light of the WDM signal light, which is amplified and output, from the optical fiber transmission path 1; and the pumping lights (the lights from the right side in the drawing) for Raman amplification, which are sent out from the optical amplifier arranged in the subsequent step.

The optical multiplexer 8 may be arranged not in the previous step of the EDF 6 but on an output side, making the excitation to be a backward excitation. However, to minimize the influence to Raman amplification, a forward excitation type as shown in FIG. 7 is preferable.

According to the embodiment, a higher gain can be obtained by combination of the optical amplification by Raman amplification and the normal amplification. Particularly, as shown in FIG. 7, in the constitution where the pumping light sources 4 and 5 for Raman amplification are arranged in the subsequent step of the EDF 6, the EDF 6 is firstly excited by the pumping lights output from the pumping light sources. Since Raman amplification function occurs by the residual pumping light that passed the EDF 6, efficient optical amplification can be performed. Irrespective of an arrangement state of the pumping light sources 4 and 5 for Raman amplification and the pumping light source 7 for the normal optical amplification, the WDM signal light to be input to the EDF 6 is already Raman amplified in the optical fiber transmission path 1 in any arrangement state. Since flatness of the optical output level is maintained, difference of the output level does not increase when the normal optical amplification is performed.

As described above, assuming that the center wavelength of the WDM signal light is 1550 nm, when the peak gain by Raman amplification occurs at the wavelength shorter than that of the pumping light by 90 nm, the gain has its peak at the same wavelength as the center wavelength of the signal light, that is 1550 nm, in the case where the signal light is Raman amplified by the wavelength at 1440 nm. Therefore, in the embodiment, the wavelengths of the pumping lights are set shorter and longer than 1460 nm at approximately 1450 nm and 1470 nm respectively. It is satisfactory that the wavelength output from the pumping light source 7 for performing the normal optical amplification is set at 1480 nm or 980 nm. If the wavelength of the pumping light for Raman amplification is close to 1480 nm, it contributes for the normal optical amplification function when the pumping light passes the EDF 6.

Next, description will be made for the third embodiment of the optical amplifier of the present invention.

Figure 8:
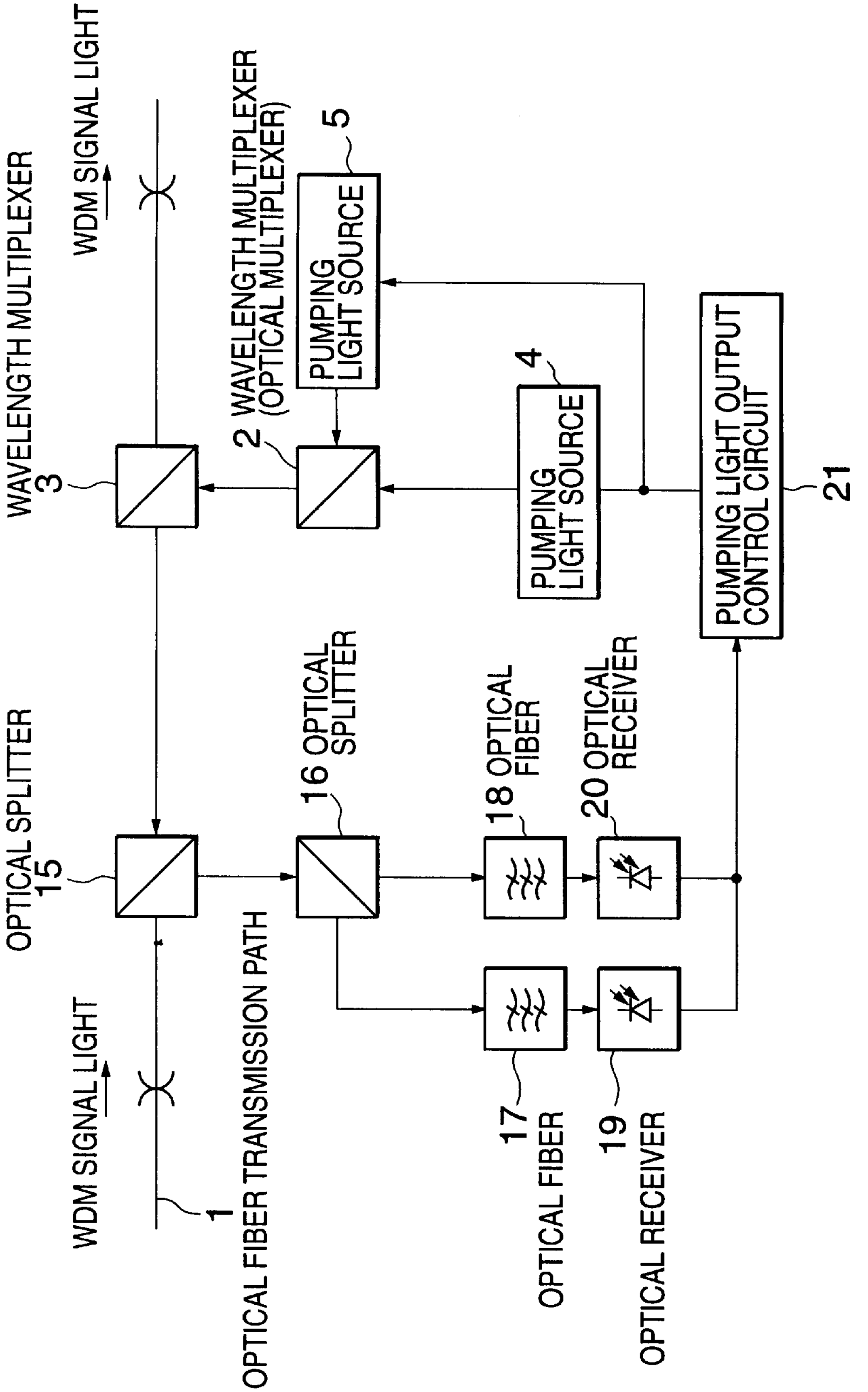
FIG. 8 is a view showing the constitution of a third embodiment of the optical amplifier of the present invention.

FIG. 8 is a view showing the constitution of the third embodiment of the optical amplifier of the present invention. The embodiment is characterized in that uniformity of the optical output level of each signal light is detected with regard to the Raman amplified WDM signal light, and the feedback control is performed for Raman amplification function.

As shown in FIG. 8, the fundamental constitution is the same as that of the variation example of the first embodiment shown in FIG. 4. In the embodiment, a part of the Raman amplified WDM signal light is split by an optical splitter 15 arranged in the previous step of the wavelength multiplexer 3. Two signal lights having the wavelengths different from each other are further extracted from the split WDM signal light, and are converted into electric signal by optical receivers 19 and 20 respectively, and the optical output levels are detected.

The optical output levels of the both signal lights are input to a pumping light output control circuit 21 to compute the difference, and the pumping light sources 4 and 5 are controlled according to the difference, that is, the uniformity (gradient of the gain to the wavelength). Since this control is the one to adjust the flatness of the gain in Raman amplification by each pumping light, the control is achieved by adjusting the pumping light output itself or the wavelength. The pumping light output level itself can be variably controlled by an injected current to the laser diode, and, as described above, the wavelength of the pumping light output can be variably controlled.

Herein, although optional two signal lights in the signal lights included in the WDM signal light are extracted, the two signal lights having the wavelengths different from each other as much as possible are preferably extracted from the viewpoint of computing the uniformity more accurately. In the embodiment, the split WDM signal light is further split into two lights by an optical splitter 16, and the signal lights are extracted from optical filters 17 and 18, which selectively transmit only light having the wavelength to be extracted. Extraction of the signal light can be also performed by sweeping by using a wavelength variable optical filter.

Figure 9:
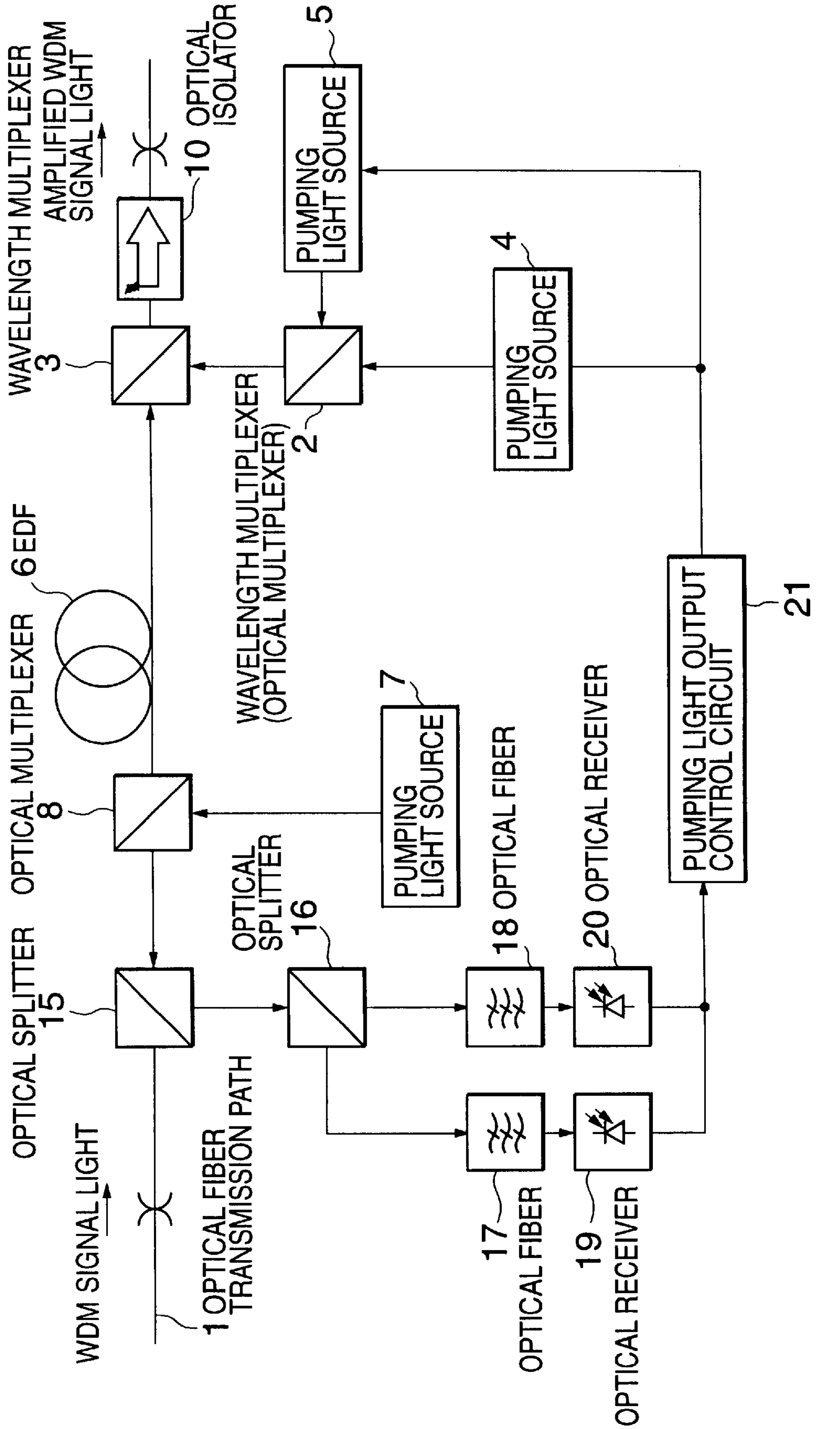
FIG. 9 is a view showing the constitution of a fourth embodiment of the optical amplifier of the present invention.
Figure 10:
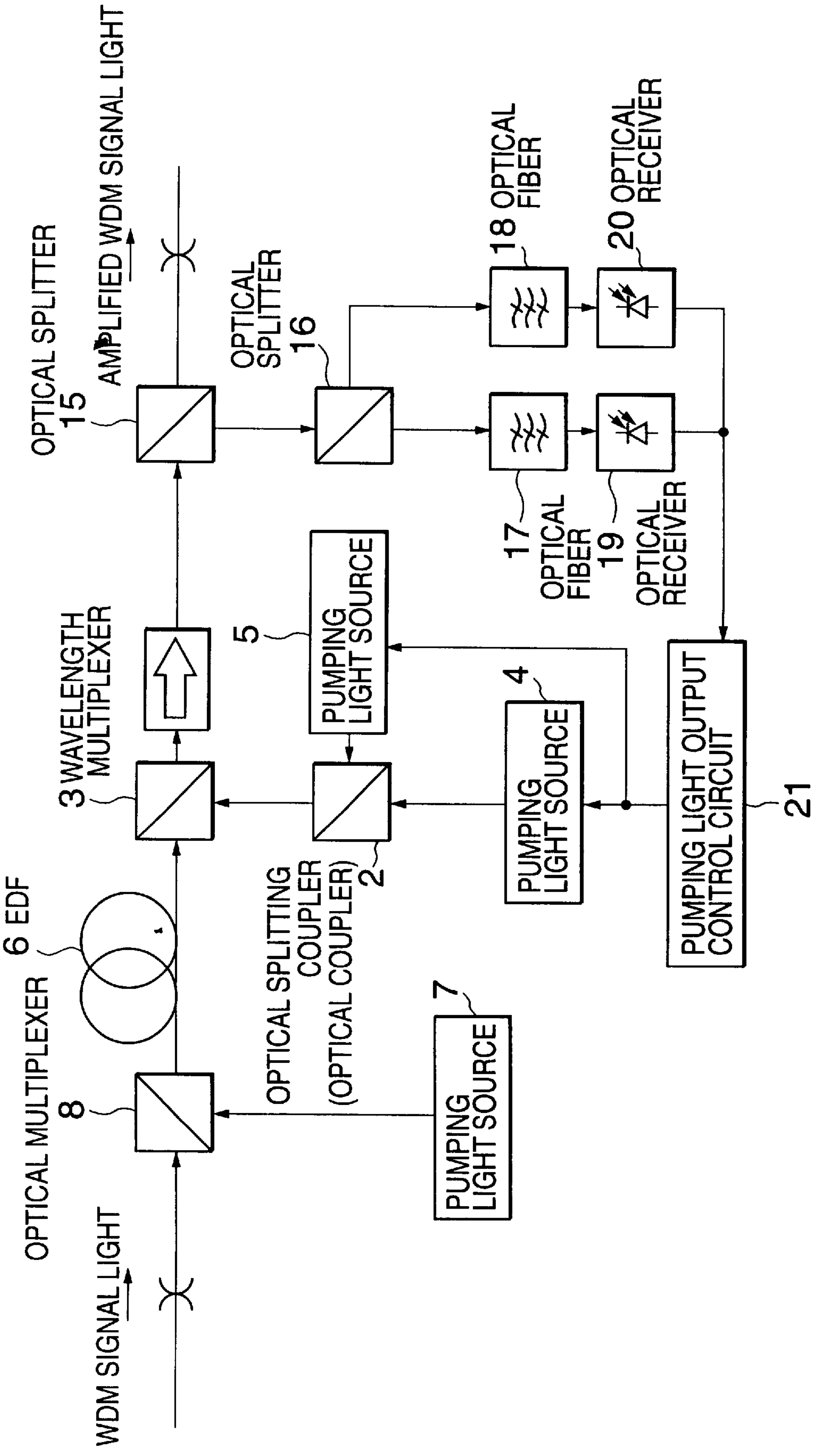
FIG. 10 is a view showing the constitution of a fifth embodiment of the optical amplifier of the present invention.

FIG. 9 and FIG. 10 show the constitutions of the fourth and fifth embodiments of the optical amplifier of the present invention respectively. These embodiments are basically the ones that comprise the feedback control function for the Raman amplified WDM signal light similarly to the third embodiment shown in FIG. 8. However, the embodiments, similarly to the second embodiment shown in FIG. 7, comprise the feedback control function in the constitution where the normal optical amplification is used in combination with Raman amplification. In the fourth embodiment shown in FIG. 9, the flatness of the WDM signal light, which is amplified only by Raman amplification, is detected to perform the feedback control. On the other hand, difference can be seen in the fifth embodiment shown in FIG. 10, where the feedback control is performed for the WDM signal light on which the normal optical amplification was performed in addition to Raman amplification.

Next, description will be made for the embodiments of the present invention with regard to the optical amplification repeater, which is arranged midway of each of the upper and lower lines, having a function to perform optical repeating and amplification on the signal light transmitting along each line.

Figure 11:
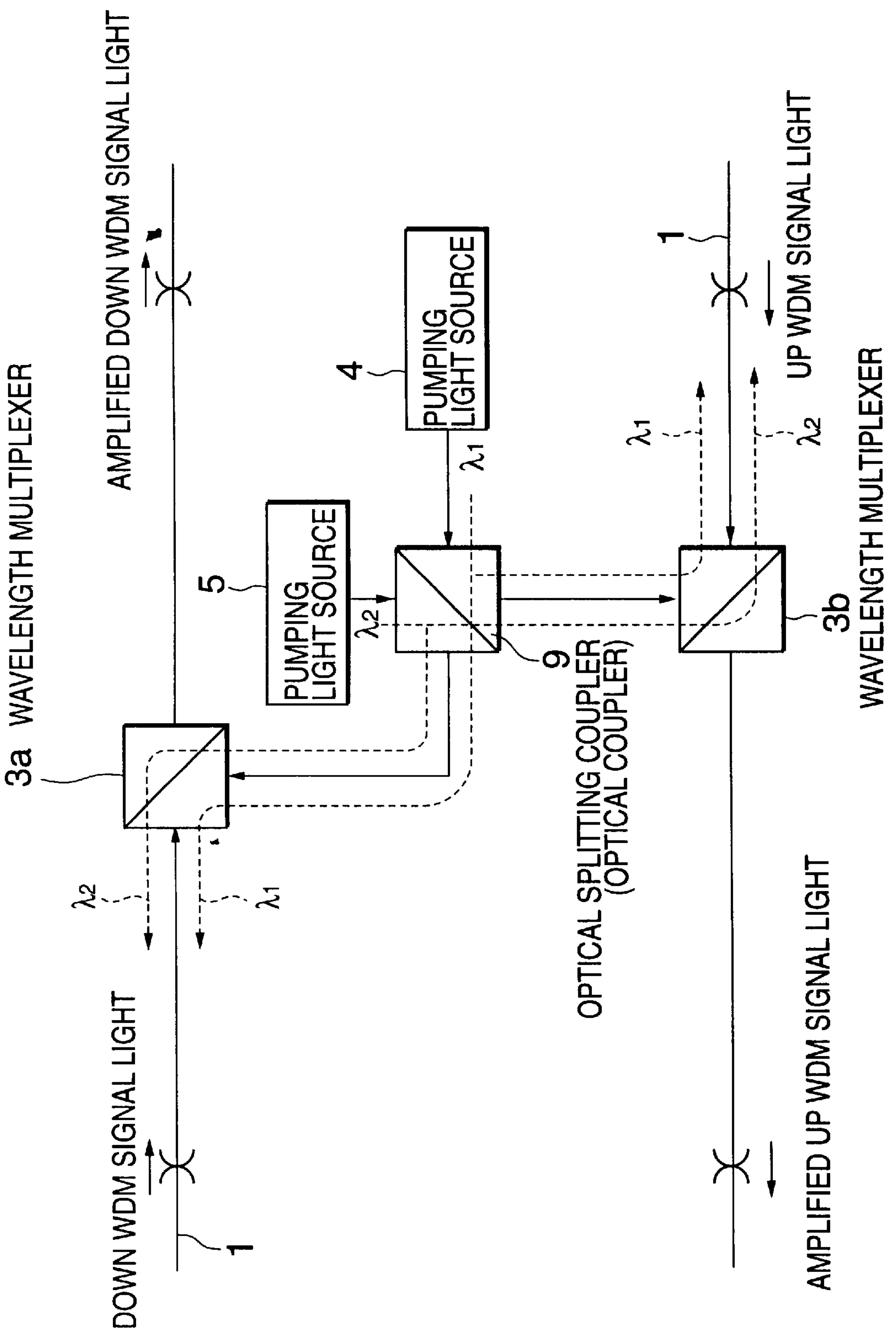
FIG. 11 is a view showing the constitution of a first embodiment of the optical amplification repeater of the present invention.

FIG. 11 shows the constitution of the first embodiment of the optical amplification repeater of the present invention. As the constitution for performing the optical amplification by Raman amplification on the both signal lights propagating in the upper and lower lines, a constitution is considered that the optical amplifiers of the present invention are simply provided in both of the upper and lower lines. Herein, for establishing the more efficient constitution, the optical amplification repeater is characterized in that the two pumping light sources 4 and 5 for Raman amplification use are commonly used by the upper and lower lines as shown in FIG. 11. Pumping lights $\lambda 1$ and $\lambda 2$ respectively output from the pumping light sources 4 and 5 are temporarily coupled in an optical splitting coupler 9. The coupled pumping lights are directly split into two lights to be output to wavelength multiplexers 3*a* and 3*b* arranged for the upper and lower lines, from which the pumping lights are sent out to the optical fiber transmission path 1 (broken lines in the drawing).

As the optical splitting couplers, optical multiplexers, optical demultiplexers, wavelength multiplexers and the like used in the present invention, ones using the dielectric multilayer, fusion type couplers or the like can be applied.

Figure 12:
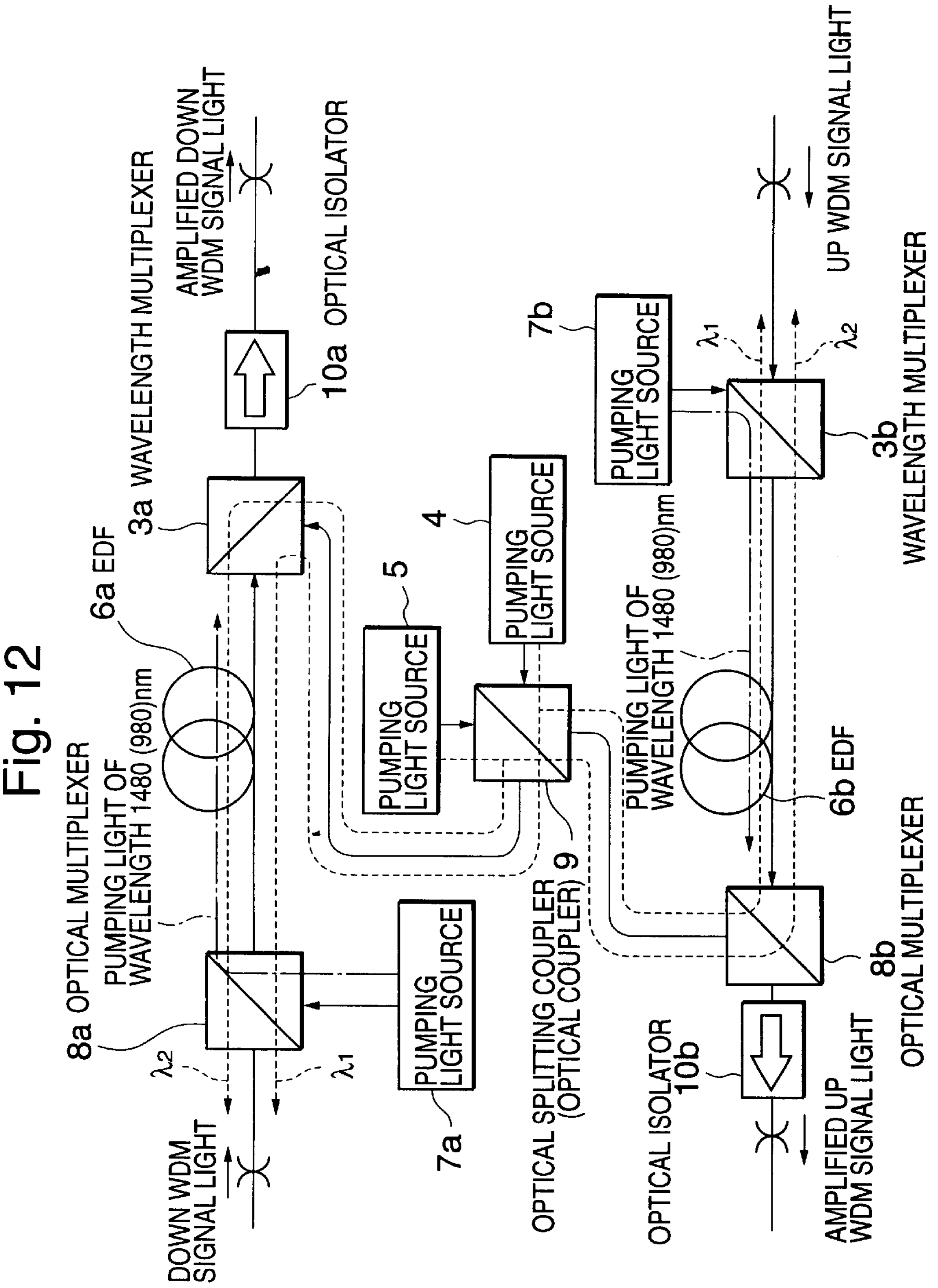
FIG. 12 is a view showing the constitution of a second embodiment of the optical amplification repeater of the present invention.
Figure 13:
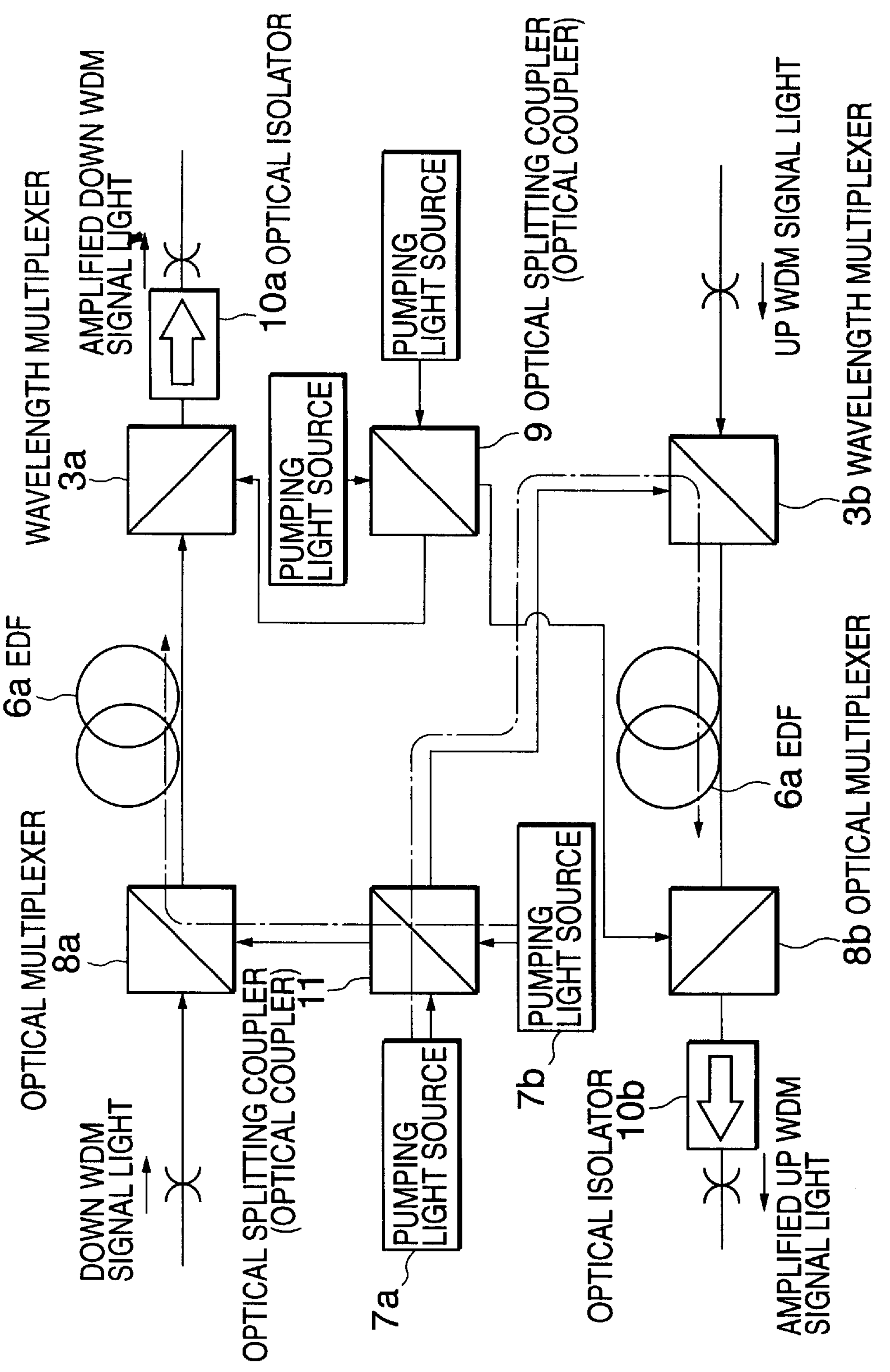
FIG. 13 is a view showing the constitution of a third embodiment of the optical amplification repeater of the present invention.

FIG. 12 and FIG. 13 respectively show the constitutions of the second and third embodiments of the optical amplification repeater of the present invention. In the embodiments, similarly to the second embodiment of the optical amplifier of the present invention shown in FIG. 7, the pumping light sources for the normal optical amplification are used in combination with the ones for Raman amplification. In the second embodiment shown in FIG. 12, pumping light sources 7*a* and 7*b* for performing the normal optical amplification are separately provided in the upper and lower lines. On the other hand, in the third embodiment shown in FIG. 13, the pumping light sources are commonly used by the upper and lower lines, and the pumping lights are coupled and split by an optical splitting coupler 11 that functions similarly to the optical splitting coupler 9, which was described in the first embodiment of the optical amplification repeater of the present invention in FIG. 11. Thus, it is possible to allow the pumping light sources to have redundancy, and a more reliable optical amplification repeater can be constituted. With regard to the pumping lights for performing the normal optical amplification, their routes are shown in chain lines in the drawing.

Next, description will be made for the WDM signal light transmission apparatus using the optical amplifier or the optical amplification repeater of the present invention.

Figure 14:
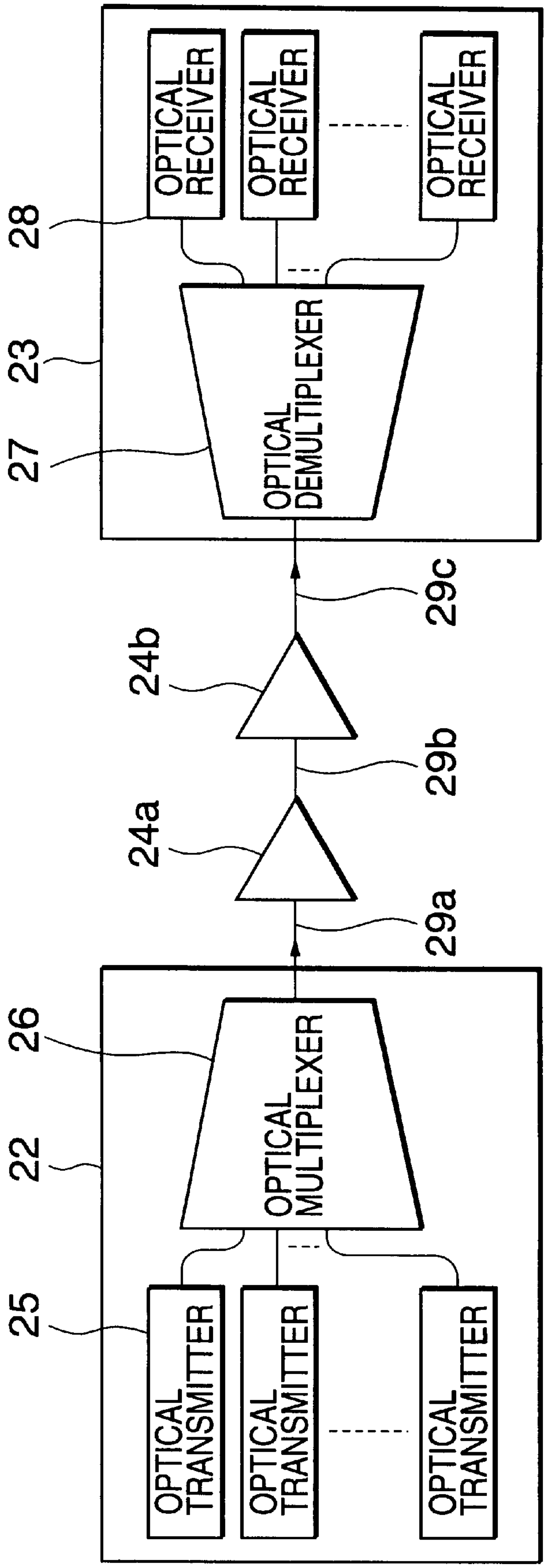
FIG. 14 is a view showing the constitution of a first embodiment of the WDM light signal transmission apparatus of the present invention.
Figure 15:
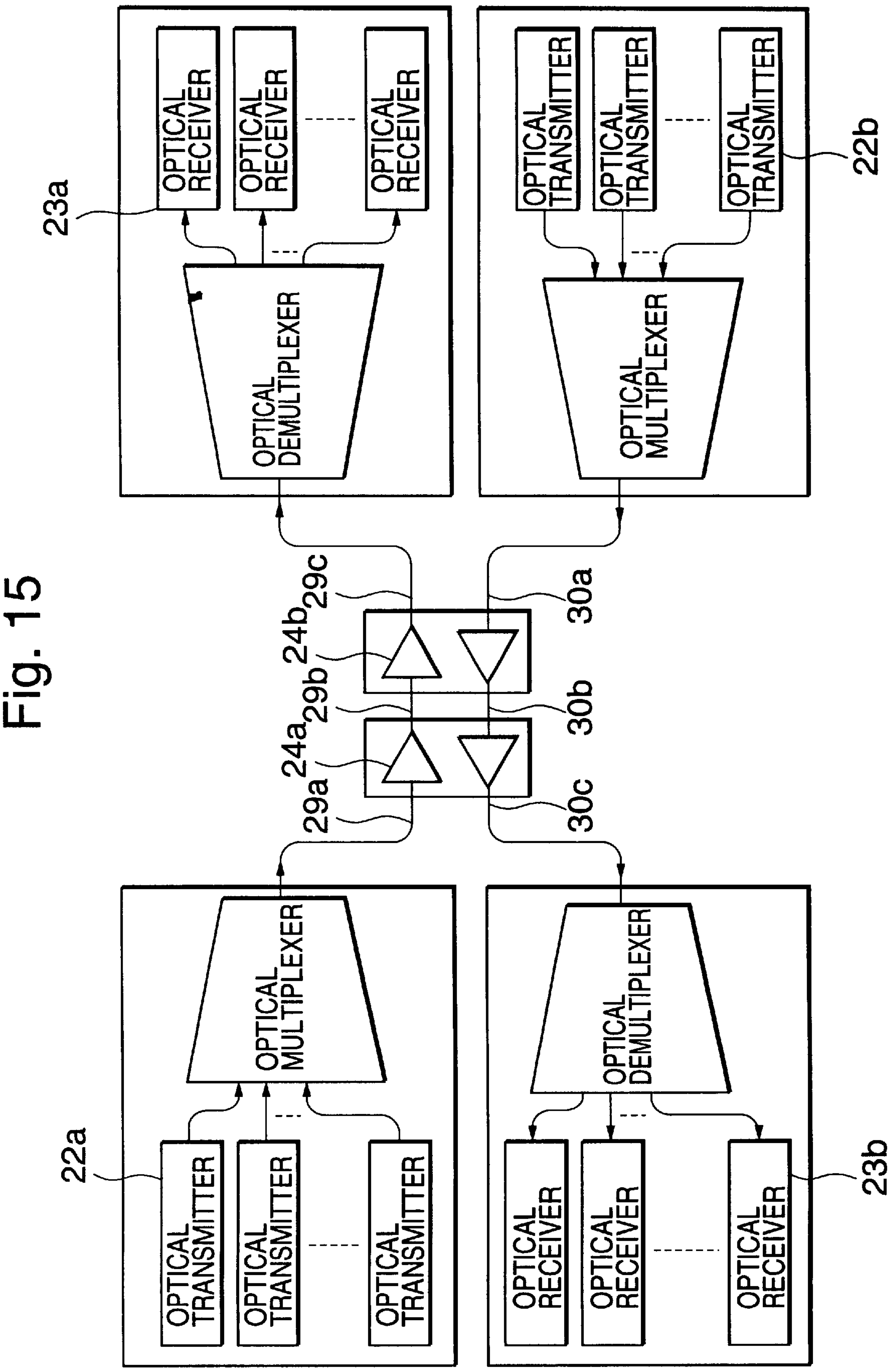
FIG. 15 is a view showing the constitution of a second embodiment of the WDM light signal transmission apparatus of the present invention.

FIG. 14 shows the constitution of the first embodiment of the WDM signal light transmission apparatus of the present invention, which is the signal light transmission apparatus for performing a light transmission in one direction. FIG. 15 shows the constitution of the second embodiment of the WDM signal light transmission apparatus of the present invention, which performs the light transmission in both directions.

Referring to FIG. 14, the WDM signal light transmission apparatus of the embodiment comprises: an optical transmission terminal station 22 for sending out the WDM signal light, in which a plurality of signal lights having the wavelengths different from each other are wavelength multiplexed; an optical fiber transmission path 29 (29*a*, 29*b*, 29*c*) for propagating the WDM signal light; an optical receiving terminal station 23 for receiving the WDM signal light; and optical amplifiers 24 (24*a*, 24*b*) arranged midway of the optical transmission path to repeat and amplify the WDM signal light. As the optical amplifiers 24 (24*a*, 24*b*), any one of the above-described embodiments of the present invention can be applied.

The optical transmission terminal station 22, for example, as shown in FIG. 14, can be constituted of optical transmitters 25 for sending out the signal lights having each wavelength (channel) and an optical multiplexer 26 for sending out the signal lights to the optical fiber transmission path 29*a* after wavelength multiplexing. On the other hand, optical receiving terminal station 23 comprises: an optical demultiplexer 27 for demultiplexing the WDM signal light sent out from the optical fiber transmission path 29*c*; and optical receivers 28 for receiving the demultiplexed signal lights respectively.

In the embodiment, the two optical amplifiers 24*a* and 24*b* are arranged in the optical fiber transmission path 29 as an example. With regard to the optical amplifier 24*a*, the pumping light for Raman amplification is sent out to the optical fiber transmission path 29*a* where the WDM signal light is Raman amplified, and input to the optical amplifier 24*a*. For the optical amplifier 24*b*, the pumping light is sent out to the optical fiber transmission path 29*b* where Raman amplification is performed.

The second embodiment of the WDM signal light transmission apparatus of the present invention shown in FIG. 15 shows the WDM signal light transmission apparatus that comprises the upper and lower lines, and transmits the WDM signal lights in both directions. Similarly to the first embodiment shown in FIG. 14, the WDM signal light transmission apparatus of the embodiment comprises: an optical transmission terminal station 22*a* for sending out the down WDM signal light, in which a plurality of down signal lights having the wavelengths different from each other are wavelength multiplexed; the optical fiber transmission path 29 (29*a*, 29*b*, 29*c*) for propagating the down WDM signal light; an optical receiving terminal station 23*a* for the down signal light for receiving the down WDM signal light; an optical transmission terminal station 22*b* for sending out the up WDM signal light, in which a plurality of up signal lights having the wavelengths different from each other are wavelength multiplexed; an optical fiber transmission path 30 (30*a*, 30*b*, 30*c*) for the up signal light for propagating the up WDM signal light; an optical receiving terminal station 23*b* for the up signal light for receiving the up WDM signal light; and the optical amplifiers 24 (24*a*, 24*b*) of the present invention. The optical amplifiers 24 (24*a*, 24*b*), which are arranged in the midway of the upper and lower optical fiber transmission paths, repeat and amplify the up and down WDM signal lights respectively. As the optical amplifiers 24 (24*a*, 24*b*), any one of the above-described embodiments of the present invention can be applied.

As described above, the optical amplifier of the present invention comprises: the two (first and second) pumping light sources for Raman amplification for outputting the first and second pumping lights; the wavelength multiplexer for Raman amplification for allowing the first and second pumping lights to be incident on the optical fiber transmission paths, where the WDM signal light propagates, in the direction opposite to the propagation direction of the signal light. The signal lights are Raman amplified by the both pumping lights. In this case, the wavelength of the first pumping light is set such that the gain of the Raman amplified signal light declines in the right direction, and, on the other side, the wavelength of the second pumping light is set such that the gain declines in the left direction.

Therefore, the gain characteristic having higher uniformity in comparison with the one obtained when the signal light is Raman amplified by the independent pumping light. Also, when the WDM signal light is amplified in the optical amplification utilizing Raman amplification function, the uniformity of the gain (optical output level) is maintained. Accordingly, the wavelength characteristic of the WDM signal light to be input to the optical amplifier can be controlled not to change by Raman amplification or to be in a state of a fixed wavelength characteristic always. Although the wavelength characteristic of Raman amplification depends on the wavelength of the pumping light, fixing the wavelength of the pumping light by the wavelength selective optical reflector enables more stable optical amplification by Raman amplification.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical amplifier, comprising:

a first pumping light source for Raman amplification, which outputs a first pumping light having a first wavelength;

a second pumping light source for Raman amplification, which outputs a second pumping light having a second wavelength; and a wavelength multiplexer for Raman amplification, which allows said first and second pumping lights to be incident on an optical fiber transmission path where a signal light propagates, wherein said signal light is Raman amplified in said optical fiber transmission path by said first and second pumping light, wherein said signal light is a wavelength division multiplexed signal light (a WDM signal light), in which the signal lights having a plurality of wavelengths different from each other are wavelength division multiplexed.

wherein said first wavelength is the wavelength to allow said signal to be Raman amplified such that the wavelength having a gain by Raman amplification as a peak becomes shorter than the wavelength of the signal light included in said WDM signal light, and said second wavelength is the wavelength to allow said signal light to be Raman amplified such that the wavelength having the gain by Raman amplification as a peak becomes longer than the wavelength of the signal light included in said WDM signal light.

2. The optical amplifier according to claim 1, wherein a gradient showing a relation between the wavelength and the gain in Raman amplification by said first pumping light and a gradient showing the relation between the wavelength and the gain in Raman amplification by said second pumping light are in opposite directions from each other, and an optical output level and the wavelength of said first and second pumping lights are respectively set such that the gains for signal lights included in said WDM signal light, on which Raman amplification was performed by said first and second pumping lights, become substantially equal to each other.

* * * * *